United States Patent
Chang

(10) Patent No.: US 7,366,810 B2
(45) Date of Patent: Apr. 29, 2008

(54) METHOD AND SYSTEM FOR MULTI-PROCESSOR ARBITRATION

(75) Inventor: Steve Chang, Fremont, CA (US)

(73) Assignee: Via Technologies, Inc., Taipei (TW)

( * ) Notice: Subject to any disclaimer, the term of this patent is extended or adjusted under 35 U.S.C. 154(b) by 79 days.

(21) Appl. No.: 11/280,544

(22) Filed: Nov. 16, 2005

(65) Prior Publication Data

US 2007/0112986 A1  May 17, 2007

(51) Int. Cl.
*G06F 13/00* (2006.01)
(52) U.S. Cl. .................. 710/116; 710/117; 710/244
(58) Field of Classification Search ............ 710/116, 710/117, 244
See application file for complete search history.

(56) References Cited

U.S. PATENT DOCUMENTS

| | | | | |
|---|---|---|---|---|
| 4,979,100 A | * | 12/1990 | Makris et al. ............ 710/117 |
| 5,193,197 A | * | 3/1993 | Thacker .................... 710/123 |
| 5,572,686 A | * | 11/1996 | Nunziata et al. ........... 710/116 |
| 5,623,672 A | * | 4/1997 | Popat ...................... 710/240 |
| 5,860,002 A | * | 1/1999 | Huang ........................ 713/2 |
| 5,884,051 A | * | 3/1999 | Schaffer et al. ............ 710/107 |
| 6,092,137 A | * | 7/2000 | Huang et al. ............... 710/111 |
| 6,467,002 B1 | * | 10/2002 | Yang ......................... 710/116 |
| 6,915,393 B2 | * | 7/2005 | Collins et al. .............. 711/153 |
| 6,925,556 B2 | * | 8/2005 | Hill et al. ..................... 713/2 |
| 7,062,582 B1 | * | 6/2006 | Chowdhuri ................ 710/116 |
| 7,107,376 B2 | * | 9/2006 | Asano et al. ............... 710/117 |
| 2003/0088722 A1 | * | 5/2003 | Price .......................... 710/244 |
| 2004/0133724 A1 | * | 7/2004 | Chae .......................... 710/107 |

FOREIGN PATENT DOCUMENTS

EP 0 834 816 A2 * 4/1998

OTHER PUBLICATIONS

*Pentium® Pro Family Developer's Manual*, vol. 1: Specification, Chapter 4, at pp. 4-1-4-42, (1996).

* cited by examiner

*Primary Examiner*—Glenn A. Auve
(74) *Attorney, Agent, or Firm*—Akin Gump Strauss Hauer & Feld LLP

(57) ABSTRACT

A computing system includes one or more buses, a plurality of bus agents, and a chip set. The plurality of bus agents are capable of accessing at least one of the buses. The chipset arbitrates access to a bus for at least two of the bus agents such that utilization of the bus for each agent is changeable.

8 Claims, 8 Drawing Sheets

METHOD AND SYSTEM FOR MULTI-PROCESSOR ARBITRATION

FIELD

This invention relates generally to processors and chipsets and, more particularly, to a method and system for multi-processor arbitration.

BACKGROUND

The Internet and advanced applications require higher performance from microprocessors, central processing units CPUs, or processors ("processors") in computing systems. These systems require processors to process instructions, access resources, and send/receive data at high speeds. Along with processors, computing systems typically include memory systems, memory caches, data/system busses, and input/output (I/O) busses connected to peripheral devices. Such components are commonly placed on a motherboard within the computer system. To manage dataflow, a motherboard can include a chipset that acts as a traffic cop. In particular, the chipset provides controller logic that controls access to data/system, I/O busses and access to memory systems and caches. In other words, the chipset handles the general dataflow on the motherboard.

One type of chipset commonly used for systems that employ the Intel Pentium® Pro Family bus architectures is the two-part chipset referred to as Northbridge and Southbridge. Northbridge typically refers to controller circuitry that communicates with one or more of the computing system's processors and controls interaction with memory and memory caches and graphics ports. Southbridge typically refers to controller circuitry that handles I/O device functions. Each of these chipsets can be referred to as a hub for handling various functions for the motherboard.

In a multi-processor system, multiple processors must share data and system busses to access resources. Typically, to determine which processor can access a bus, a bus arbitration scheme must be implemented. A prior bus arbitration scheme is described in the *Pentium® Pro Family Developer's Manual*, Volume 1: Specifications, Chapter 4, at pp. 4-1-4-42, (1996) ("Pentium Pro Developer's Manual") that is used in a prior multi-processor system using, e.g., the Northbridge and Southbridge chipsets. In this scheme, a bus agent can be a symmetrical agent or a priority agent. For a symmetrical agent, it shares access to a bus equally with other symmetrical bus agents, e.g., using a round-robin algorithm. A priority agent, however, will be granted access to a bus over a symmetrical agent. Processors are considered symmetrical agents and I/O devices or memory systems are considered priority agents.

Such a prior bus arbitration scheme has a number of limitations. For instance, in a multi-processor system, a special type of processor is required with built-in arbitration logic to implement the bus arbitration protocol. Furthermore, in the case where the multiple processors are considered symmetrical agents, the prior bus arbitration scheme is fixed and each processor has equal share of a bus, regardless of processor type or operation being performed. As a result, this scheme lacks flexibility for changing utilization of a bus among different types of processors from a policy point of view. In addition, this scheme cannot take into account different bus utilization models and information. For example, in the event when one processor may have a higher demand for a bus over another processor, granting bus utilization equally among the processors disadvantages the higher demand processor. The inflexibility of the bus utilization scheme can severely degrade system performance. Moreover, the prior chipset also required a system reset when processor configurations changed in the system and that all processors be synchronized at all time. In addition, the bus arbitration scheme for the prior chipset was limited to a maximum of four processors on the motherboard and not expandable for computing systems requiring more than four processors.

Thus, what is needed is an improved bus arbitration scheme that is flexible for changes to bus utilization in a computing system (without requiring special multi-processors). Additionally, improved chipsets are needed that are scalable and provide smooth system transitions in the case of processor configuration changes.

SUMMARY

According to one aspect of the invention, a computing system includes one or more buses, a plurality of bus agents, and a chip set. The plurality of bus agents are capable of accessing at least one of the buses. The chipset arbitrates access to a bus for at least two of the bus agents such that utilization of the bus for each agent is alterable. According to another aspect of the invention, in a computing system having a chipset and a plurality of bus agents coupled by at least one bus, a method is disclosed in which bus utilization is changed in the chipset for at least one of the bus agents based on an alterable arbitration policy. A request is granted to a bus by the chipset in accordance with the alterable arbitration policy.

According to another aspect of the invention, a method for a chipset in a computing system is disclosed in which one or more parameters are monitored that are associated with at least one bus agent. A bus resource is allocated to at least one bus agent based on the monitored one or more parameters in accordance with an arbitration policy. According to another aspect of the invention, a chipset is disclosed having a first hub and a second hub. The first hub provides a first set of bus agents access to a bus. The second hub provides a second set of bus agents access to a bus. The first hub or the second hub is capable of changing bus utilization for the bus agents in the first set or second set, respectively.

According to another aspect of the invention, a bus arbitration method is disclosed. A first priority request is received for ownership of a bus from a first priority agent. The bus owner is informed of the first priority request for ownership of the bus. The first priority agent is granted access to the bus such that the first priority agent becomes the bus master. A second priority request is received for ownership of the bus from a second priority agent. Access to the bus is arbitrated between the second priority agent and the first priority agent bus master based on an alterable arbitration policy.

According to another aspect of the invention, in a computing system having a boot-strap processor and at least one multi-processor, a method is disclosed. Ownership of a bus is held by the boot-strap processor. Access to the bus is requested by the multi-processor. A dynamic arbitration scheme is used to grant ownership of the bus to the boot-strap processor or the multi-processor. According to another aspect of the invention, a computing system is disclosed having a boot-strap processor, at least one multi-processor, and a chipset. The chipset includes a state machine configured to hold ownership of a bus by the boot-strap processor, request access to the bus by the multi-processor, and use a dynamic arbitration scheme to grant ownership of the bus to the boot-strap processor or the multi-processor.

BRIEF DESCRIPTION OF THE DRAWINGS

The accompanying drawings, which are incorporated in and constitute part of this specification, illustrate examples, implementations, and embodiments of the invention, and together with the description, serve to explain the principles of the invention. In the drawings.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same. The following techniques overcome disadvantages of the prior bus arbitration techniques and chipsets for utilizing a bus in a computing system.

According to one example, a computing system includes one or more buses, a plurality of bus agents, and a chipset. The plurality of bus agents are capable of accessing at least one of the buses. The chipset arbitrates access to a bus for at least two of the bus agents such that utilization of the bus for each agent is alterable. In this manner, bus utilization for various agents (e.g., a multi-processor) can vary in order to optimize system performance and provide flexibility in bus utilization. In another example, for a computing system having a chipset and a plurality of bus agents coupled by at least one bus, a method is disclosed in which bus utilization is changed in the chipset for at least one of the bus agents based on a dynamic (alterable) arbitration policy. A request is granted for access to a bus by the chipset in accordance with the dynamic arbitration policy. Parameters or system information can be collected and processed in altering or varying the arbitration policy.

Further examples include a method for a chipset in a computing system in which one or more parameters are monitored that are associated with at least one bus agent. A bus resource is allocated to at least one bus agent based on the monitored one or more parameters in accordance with an arbitration policy. In this manner, the chipset implements bus arbitration instead of requiring special multi-processors without built-in arbitration logic. The chipset can also monitor parameters in real-time, which can make the bus arbitration process more efficient. Changes to bus arbitration for one or more bus agents (e.g., a multi-processor) can be implemented dynamically without requiring a system reset or resetting any other processor. The following description illustrates some exemplary techniques.

Figure 1:
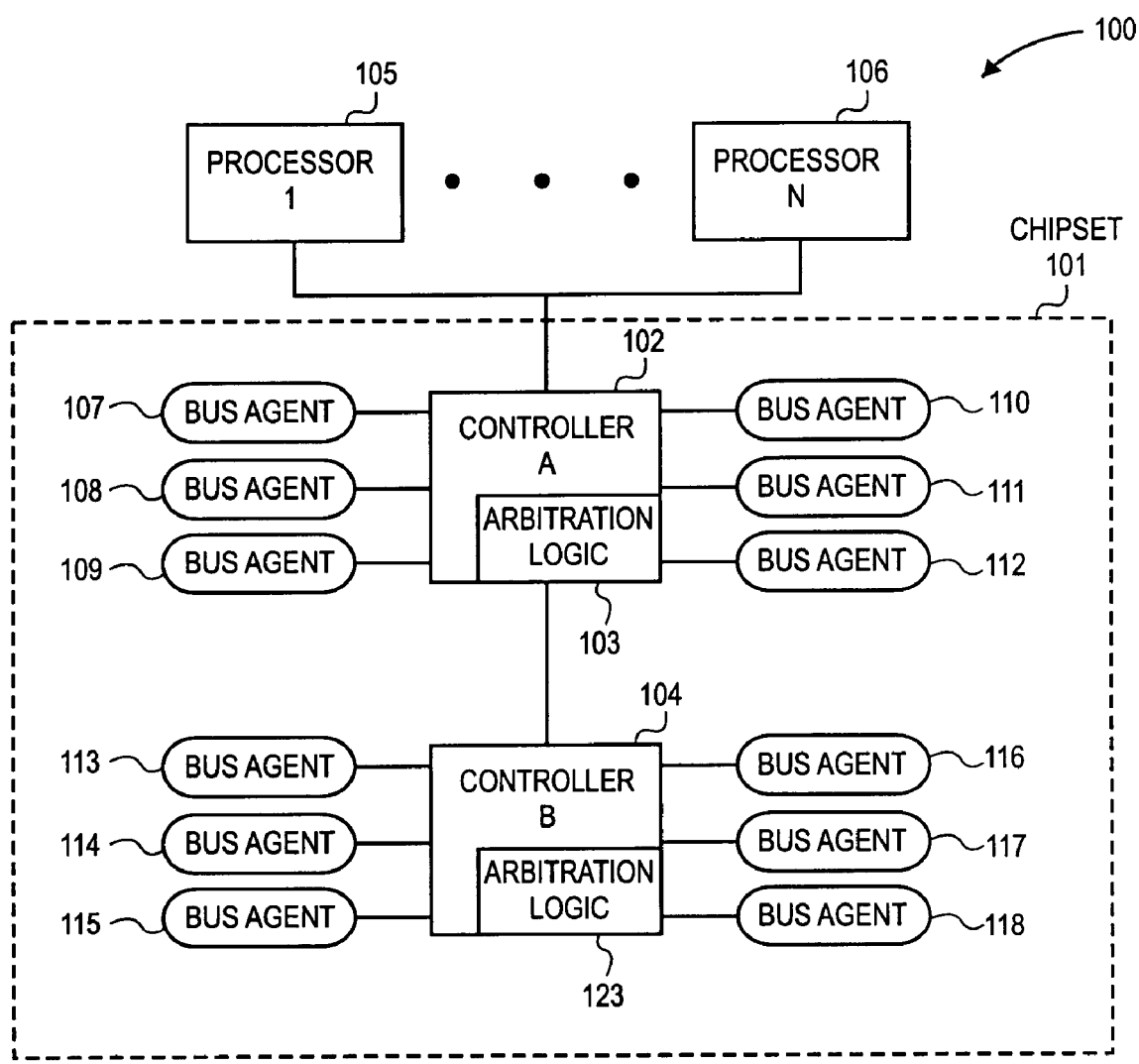
FIG. 1 illustrates one example of a multi-processor computing system with a chipset having controllers with built-in arbitration logic.

FIG. 1 illustrates one example of a multi-processor computing system 100 with a chipset 101 having two hubs, controllers A and B (102, 104) with built-in arbitration logic (103, 123), respectively. Chipset 101 acts as core logic for computing system 100 and can be located on a motherboard of computing system 100. Chipset 101 includes two controllers A and B (102, 104) to service different bus agents and processors. Although not shown, a processor or CPU bus can interface the bus agents and processors. In this example, controller A (103) services a plurality of processors 1 through N (105-106) and bus agents 107 through 112. Examples for bus agents 107-112 can include system memory and system graphic devices. Examples of processors 105-106 can include any type of general purpose central processing unit (CPU) or microprocessor, such as those in the Pentium® family of microprocessors. Processors 1 (105) through N (106) can also be considered bus agents within computing system 100. Further, in certain examples, one of the processors can be a boot strap CPU that performs system initialization and setup to enable the multi-processor bus arbitration disclosed herein. Another processor can be a multi-processor CPU.

The controller A (102) can act as the primary interface or hub between the multiple processors 1 (105) through N (106) and the bus agents 107-112. The controller B (104) services a plurality of bus agents 113 through 118. Examples of bus agents 113-118 can include multiple types of input/output (I/O) devices such as serial ATA devices, RAID devices, USB devices, serial ATA drives, PCI devices, audio/video devices, and other (I/O) devices. Although not shown, one or more I/O busses can couple the bus agents 113-118 with the controller B (104). The controller B (104) can act as the primary interface or hub between I/O devices and processors 1 (105) through N (106) and bus agents 107-112 through controller A (102). As shown in this example, chipset 101 provides controller hardware (i.e., controllers A and B) that interfaces the 1 (105) through N (106) processors with the rest of computing system 100. Chipset 101 can thus implement control and data pathways to memory and I/O and peripheral subsystems.

The arbitration logic 103 and 123 in controllers A (102) and B (104), respectively, can implement a bus arbitration scheme for bus agents 117-112 and 113-118 according to exemplary arbitration techniques described herein. As detailed below, the arbitration logic 103 and 123 can implement certain schemes, such as an "asymmetrical" arbitration scheme. For this type of scheme, the bus utilization of a bus agent or processor is dynamic, changeable or alterable and not fixed in contrast to other bus arbitration schemes. In other examples, chipset 101 through arbitration logic 103 can implement dual-single processor arbitration, for example, in the case of computing system 100 having N=2 processors. In the case controller B (104) interfaces with I/O or peripheral devices through peripheral busses (e.g., PCI or AGP bus), such devices can be considered priority agents in which case arbitration logic 123 can implement a priority bus arbitration scheme.

Figure 2:
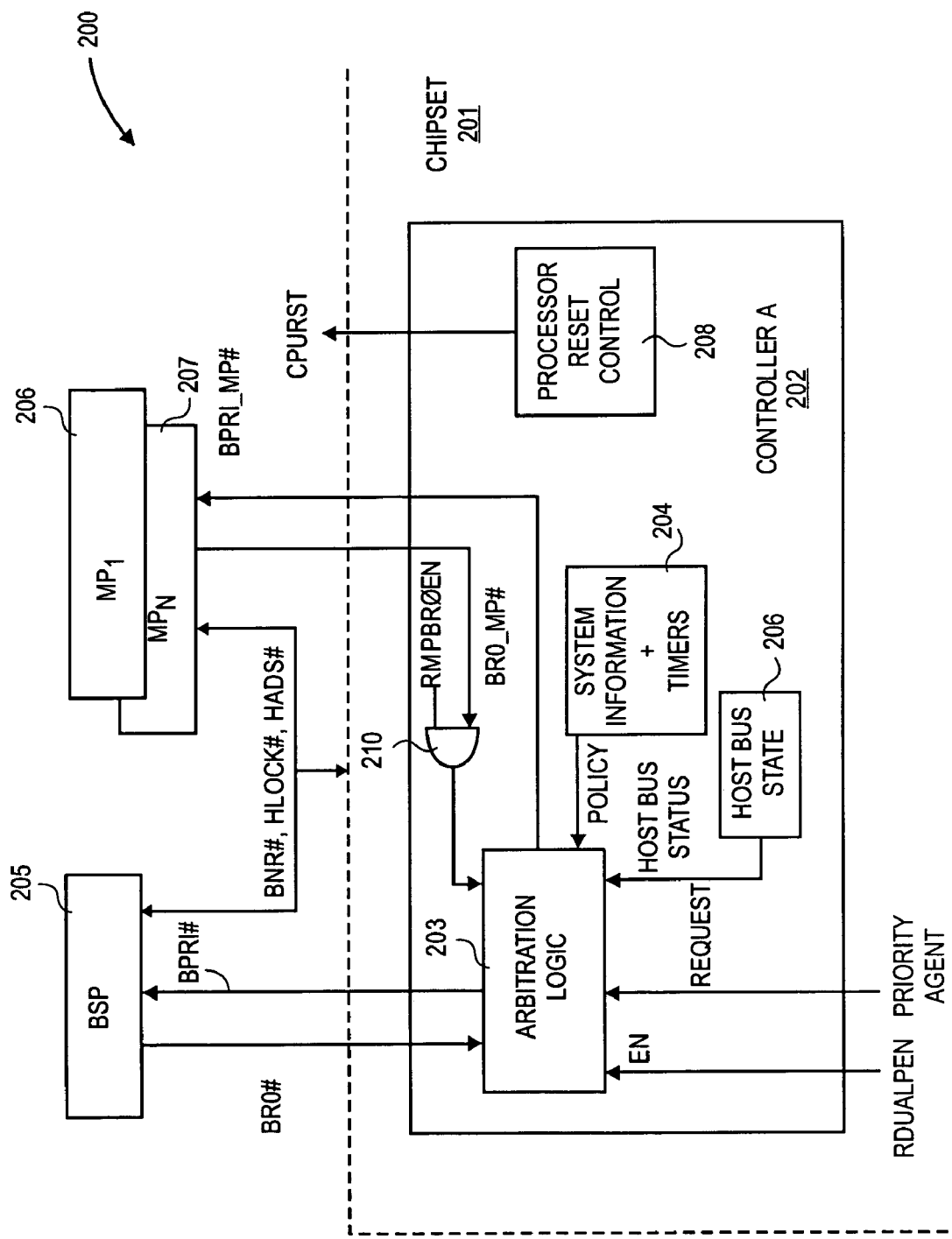
FIG. 2 illustrates one example of detailed controller circuitry within a chipset.

FIG. 2 illustrates one example of detailed controller circuitry within the chipset 201 of the computing system 200. In this example, the detailed controller circuitry is described with respect to controller A (202). This detailed circuitry, however, can be implemented in another controller, e.g., controller B (104) as described in FIG. 1. As shown, BSP 205 is a boot-strap processor or CPU within computing system 200. It is the main processor that performs system initialization and setup to enable the multi-processor arbitration scheme described herein. $MP_1$ (206) through $MP_N$ (207) represent 1 through N multi-processors or CPUs for computing system 200 wherein N can be any integer.

Chipset 201 is the core logic for computing system 200. In this example, only the interface between BSP 205 and $MP_1$ through $MP_N$ are illustrated. Chipset 201 can also interface BSP 205 and $MP_1$ through $MP_N$ to memory and peripheral systems or other bus agents. The controller A (202) within chipset 201 includes arbitration logic 203 receiving a number of inputs to implement a dynamic arbitration policy. For example, arbitration logic 203 can be implemented as a state machine that receives inputs such as bus status information, system information, and policy setting parameters to determine various states for assigning and granting bus ownership accordingly. The system information and timers logic 204 can supply such parameters to arbitration logic 203. This logic can collect a variety of information or parameters for arbitration logic 203. Examples of parameters include CPU utilization information, arbitration policy setting parameters, bus status information, timer or clock information. For example, in two CPU system (CPU1 and CPU2), CPU1 can be set for 40%, CPU2 can be for 40%, and a priority agent can be set for 20% of the total bus utilization time.

The arbitration logic 203 uses information and parameters from system information and timer logic 204 to implement a dynamic arbitration policy. For example, timers or clocks can be associated with each agent to measure the amount of time an agent owns a bus. The logic 204 can monitor these timers or clocks and, after a determined time of bus ownership has expired, the logic 204 informs arbitration logic 203 to change bus ownership based on the corresponding timer. The expiration time can be changed or altered for any agent in real-time without requiring a system reset. For example, processor A can be assigned 10 us while a processor B can be assigned 20 us of bus ownership. In this manner, the arbitration logic 203 can implement a dynamic and asymmetric arbitration policy. Other examples include assigning a particular agent or processor a certain percentage of time. For example, within a 100 us period, processor A can be granted 60 us of bus ownership while processor B is granted 40 us. Further, system information such as application type running on a certain processor can also be used to dictate the arbitration policy.

Other inputs to arbitration logic 203 include a bus request from a priority agent, e.g., a device or bus master connected to a peripheral bus such as a PCI or AGP bus. Such a device can request CPU bus ownership for any number of functions, e.g., to perform a bus snooping request on behalf of a PCI bus master. In particular, for a PCI master, to access main memory, hosts bus snooping is required in order to keep CPU cache memory-coherency. Such a request can be a higher priority request over one of the multi-processor CPU's bus request. In this case, the PCI bus master is considered a priority agent and will be granted access by the arbitration logic 203.

Referring to FIG. 2, arbitration logic 203 receives a bus request signal BR0# from BSP 205. BSP 205 will assert this signal on a corresponding pin to access the CPU bus. The bus arbitration logic 203 also outputs a bus request signal BPRI# to the BSP 205 in order to inform it that a priority agent or multi-processors 1 (206) through N (207) has requested access to the CPU bus. Chipset 201 will assert the corresponding pin to output the BPRI# signal to the BSP 205 to request bus ownership. The multi-processors 1 (206) through N (207) will output a bus request signals BR0_MP# to chipset 201 when requesting CPU bus ownership. The BR0_MP# is input to an AND gate 210 along with an enable signal RMPBR0EN. The RMPBR0EN signal is the enable bit signal for each multi-processor $MP_1$ (206) through $MP_N$ (207). When this bit is 0 for a multi-processor, a new request from the multi-processor is effectively disabled. Processor cache snooping, however, is still applicable in such a state.

The output of the AND gate 210 in FIG. 2 is input to arbitration logic 203. The bus arbitration logic 203 outputs a bus request signal BPRI_MP# to any one of the multi-processors $MP_1$ (206) through $MP_N$ (207) to inform them that a priority agent or BSP 205 has requested CPU bus ownership. Chipset 201 will assert the corresponding pin(s) to output the BPRI_MP# signal(s) to appropriate $MP_1$ through $MP_N$. The BSP 205 and the multi-processors $MP_1$ (206) through $MP_N$ (207) also have shared CPU signals, which include BNR#, HLOCK#, and HADS#, where BNR# can be used to block a next request from a bus agent. In certain examples, if BNR# is active, neither symmetrical nor priority agent can generate a new request regardless of bus ownership. The HADS# is the beginning of a transaction signal and current bus owner asserts HADS# to start a new bus request. The arbitration logic 203 also receives an enable signal RDUALPEN and a host bus status from a host bus state logic 206. The RDUALPEN signal is a configuration bit that enables the state machine of the arbitration logic 203. When this bit is 0, the computing system 200 can be placed in uni-processor mode.

The host bus state logic 206 can include any type of circuitry or be implemented in software to track the current host bus stated based on processor bus cycles and provide inputs to the state machine of the arbitration logic 203. In some examples, arbitration logic 203 can output BPRI_MP# in an active state after reset from the processor reset control logic 208, regardless of the value of the RDUALPEN signal. The processor reset control logic 208 generates CPU reset cycles during system reset (cold reset) and multi-processor initialization event (warm reset). Processor reset can be CPU mode switched that brings a processor on-line/off-line. This control module can also monitor processor and host bus queues to make sure transaction lost is not caused by a CPU reset event.

Figure 3:
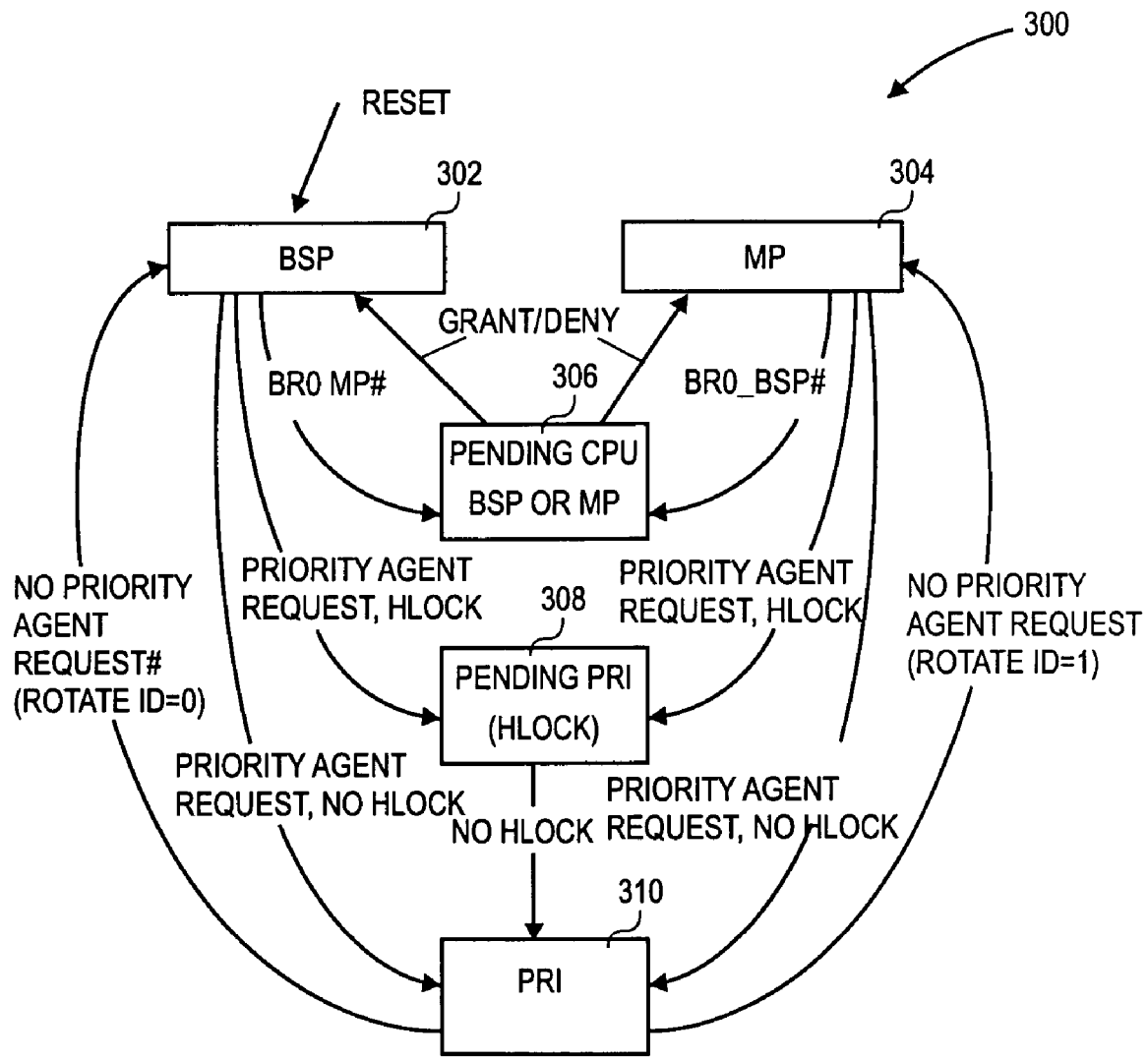
FIG. 3 illustrates one example of a state diagram implemented by the arbitration logic within a chipset.

FIG. 3 illustrates one example of a state diagram 300 implemented by the arbitration logic within a chipset, e.g., the arbitration logic in FIGS. 1 and 2. This example shows a BR0# controlled arbitration scheme. At the BSP state 302, the boot-strap processor owns or holds ownership of the CPU bus. After reset, this is the default system state. The boot-strap processor can then perform initialization task and switch to multi-processor mode as appropriate. From the BSP state 302, when the bus request signal BR0_MP# is asserted from a multi-processor requesting bus ownership, the state machine enters into the pending CPU state 306. This state precedes the arbitration logic 203 granting bus ownership to either the boot-strap processor BSP or a multi-processor. The state 306 is thus the intermediate state before the CPU bus ownership is transferred. Bus ownership can be transferred or granted based on a dynamic arbitration scheme using, e.g., timer expiration, time slot arbitration, etc. In one example, if both a BSP and MP requested bus access and the BSP was the current bus owner and its timer expired, the state machine would grant the MP access to the bus.

From the BSP state 302 or the MP state 304, the state machine can also enter the pending priority PRI (HLOCK)

state 308 when there is a priority agent request and the HLOCK signal is asserted from either the boot-strap processor BSP or a multi-processor MP. The HLOCK signal is a CPU bus lock signal. The current CPU bus owner asserts this signal in order to have non-divisible bus access between back to back bus cycles. During this state 308, the current locking owner of the CPU bus will keep ownership until the lock cycle is completed. Once the HLOCK state is over, the state machine then enters into priority PRI state 310 and a pending priority agent request will be granted. If there are more than one priority agent requests, a dynamic arbitration scheme can also be implemented for these priority requests.

After a priority requests has been processed and there is a bus request from a BSP or MP and there are no other priority agent requests, the state machine will grant the BSP or MP bus access based on a rotate ID. For example, if the rotate ID=0 the BSP is granted bus access and if the rotate ID=1 the MP is granted bus access. The rotate ID is the ID for the last CPU owner. In one example, the arbitration logic 203 stores the last bus owner ID in order to implement fair arbitration scheme. Other fair arbitration schemes can be used. In the PRI state 310, the chipset is the owner of the processor bus. Priority agents or bus masters can then issue requests for processor cache snooping. Thus, the state machine thus performs arbitration between the boot-strap processor, multi-processors, and priority agents.

Figure 4:
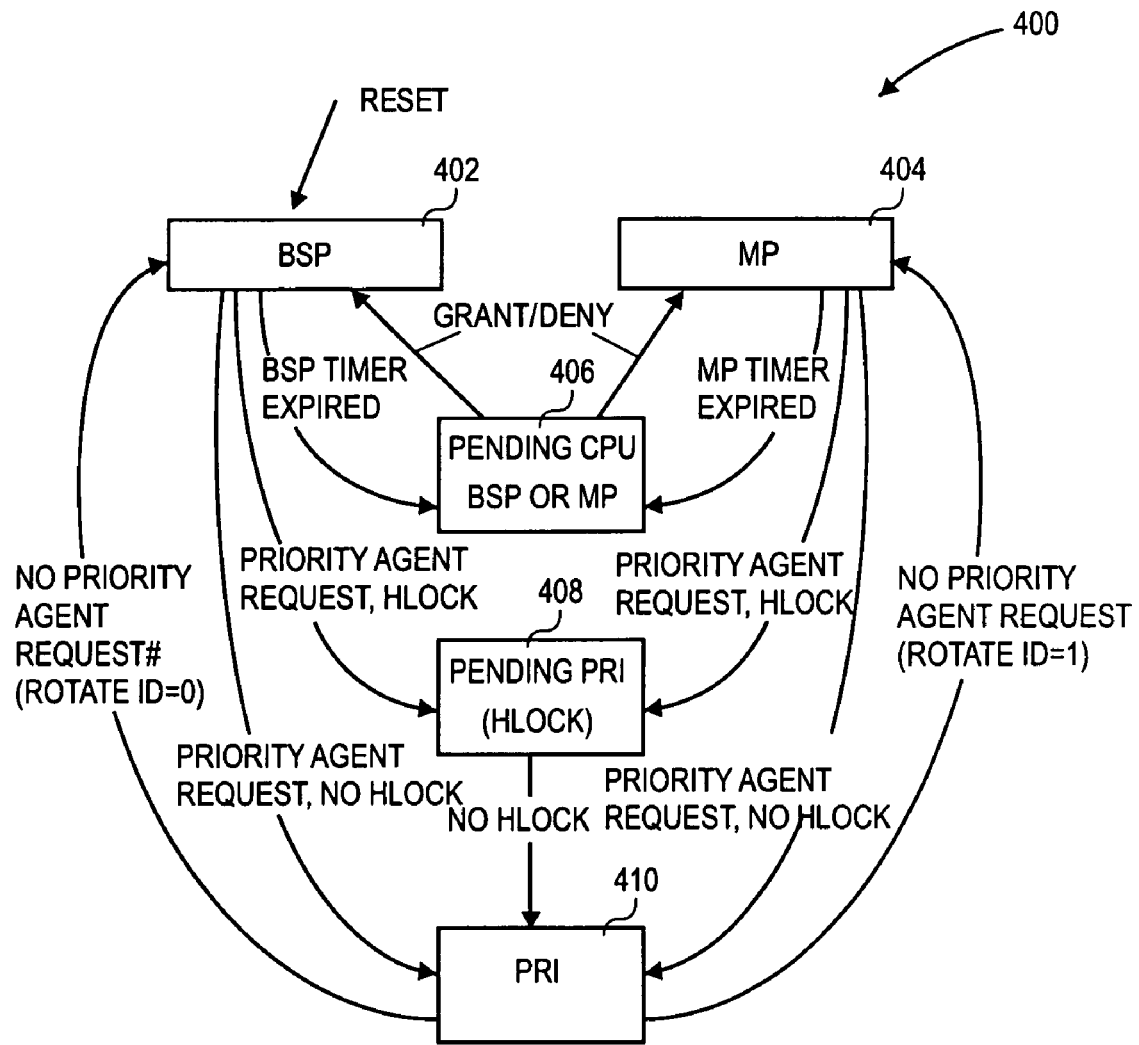
FIG. 4 illustrates another example of a state diagram implemented by the arbitration logic within a chipset.
Figure 5:
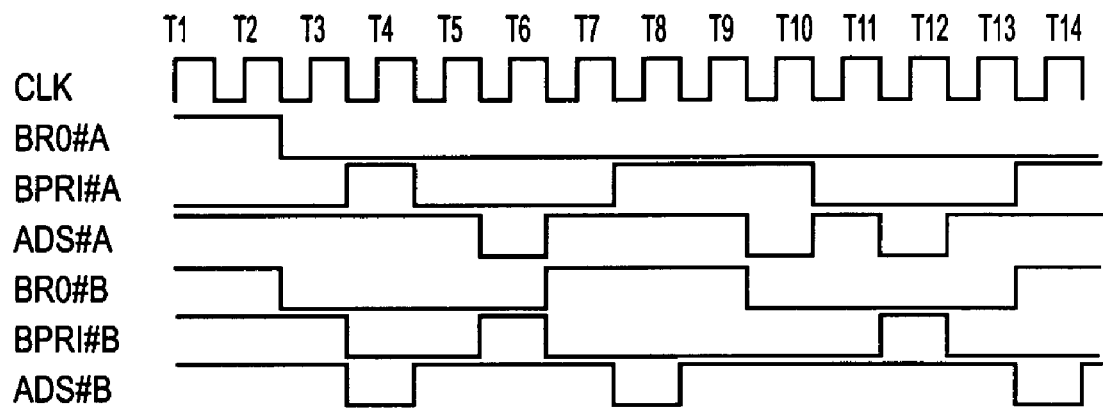
FIG. 5 illustrates one example timing diagram for arbitration in dual-processor mode that is BR# controlled.
Figure 6:
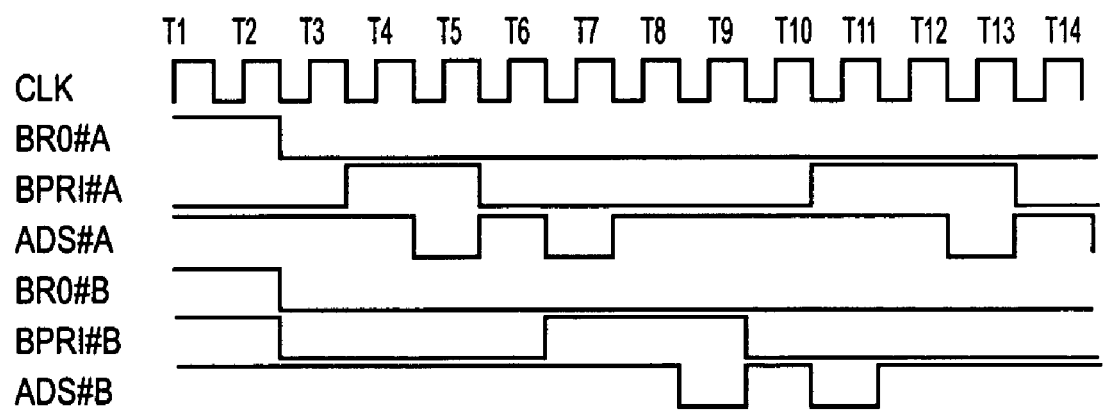
FIG. 6 illustrates one example timing diagram for time slot arbitration in dual-processor mode.
Figure 7:
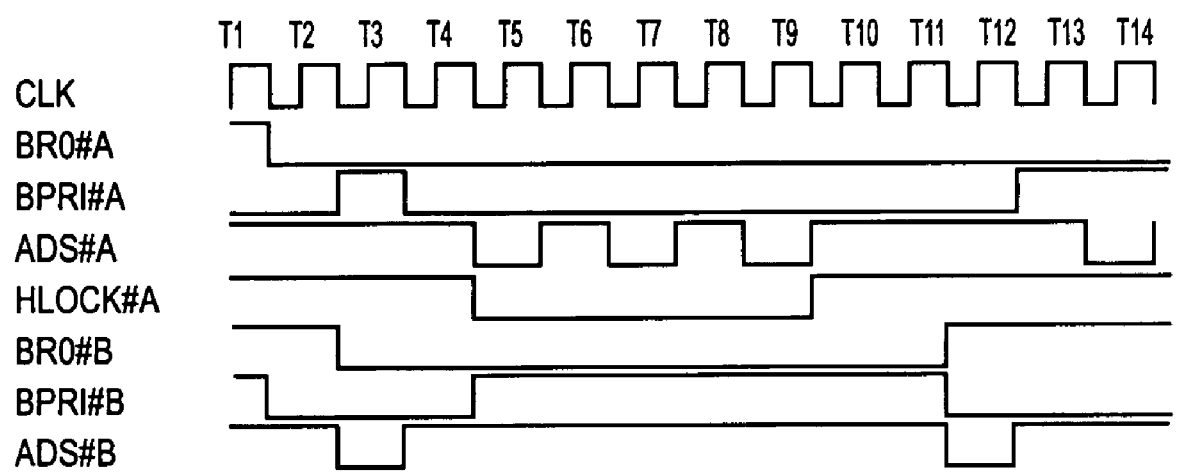
FIG. 7 illustrates one example timing diagram for HLOCK cycle arbitration in dual-processor mode.

FIG. 4 illustrates another example of a state diagram 400 implemented by the arbitration logic within a chipset. The state diagram 400 is similar to the state diagram 300 shown in FIG. 3. In this example, the state machine will enter the pending CPU state 406 from the BSP state 402 or the MP state 404 when a timer has expired for a BSP or a MP. That is, for example, if the BSP was granted bus ownership and its associated timer expired and there is a pending request from a MP, the MP will be granted bus ownership—provided there are no priority requests. The timer is configurable as well as the expiration time. All other states of state diagram 400 operate in the same manner as in state diagram 300 of FIG. 3. FIGS. 5-7 illustrate exemplary timing diagrams for dual-processor arbitration for N=2 processors in accordance with the state diagrams of FIGS. 3 and 4.

FIG. 5 illustrates one example timing diagram for arbitration in dual-processor mode that is BR# controlled. In this example, a low signal indicates an active state and a high signal indicates an inactive state. In other examples, the states can be reversed from high to low. Referring to FIG. 5, from T1 to T3 processor B is the bus owner (BPRI#A active, BPRI#B inactive). Processor B asserts bus request (ADS#) at T3. From T4 to T5, processor A is the bus owner (BPRI#A inactive at T3). Processor A samples BPRI# at T4 and asserts bus request at T5. From T6 to T7, processor B is the bus owner (BPRI#B inactive at T5). Processor B samples BPRI# at T6 and asserts bus request (ADS#) at T7. From T8 to T11, processor A is the bus owner (BPRI#A inactive at T7). Processor A samples BPRI# at T8 and asserts bus request at T9 and T11. From T12 to T13, processor B is the bus owner (BPRI#B inactive at T11). Processor B samples BPRI# at T12 and asserts bus request (ADS#) at T13.

FIG. 6 illustrates one example timing diagram for time slot arbitration in dual-processor mode. In this example, a low signal indicates an active state and a high signal indicates an inactive state. Referring to FIG. 6, both processors A and B assert BR0# at T2. Processor A is granted bus from T4 to T7. In this example, after $2^{nd}$ ADS# from processor A, a time slot counter can be used for a chipset (through arbitration logic) to switch bus ownership to processor B from T8 to T11. After $2^{nd}$ ADS# from processor B, time slot counter can be used to switch back to processor A from T12 to T15.

FIG. 7 illustrates one example timing diagram for HLOCK cycle arbitration in dual-processor mode. In this example, a low signal indicates an active state and a high signal indicates an inactive state. Referring to FIG. 7, processor B asserts ADS# at T2. Bus arbitration switches to processor A at T2. Processor A samples BPRI# inactive at T3, generates ADS# at T4 with HLOCK# active. With HLOCK# asserted from T4 to T9, processor A generates consecutive ADS# at T6 and T8. In this example, BPRI# assertion is masked off by HLOCK# in this case. After processor A completes bus lock access at T9, processor B gains bus ownership and generates ADS# at T11.

Figure 8:
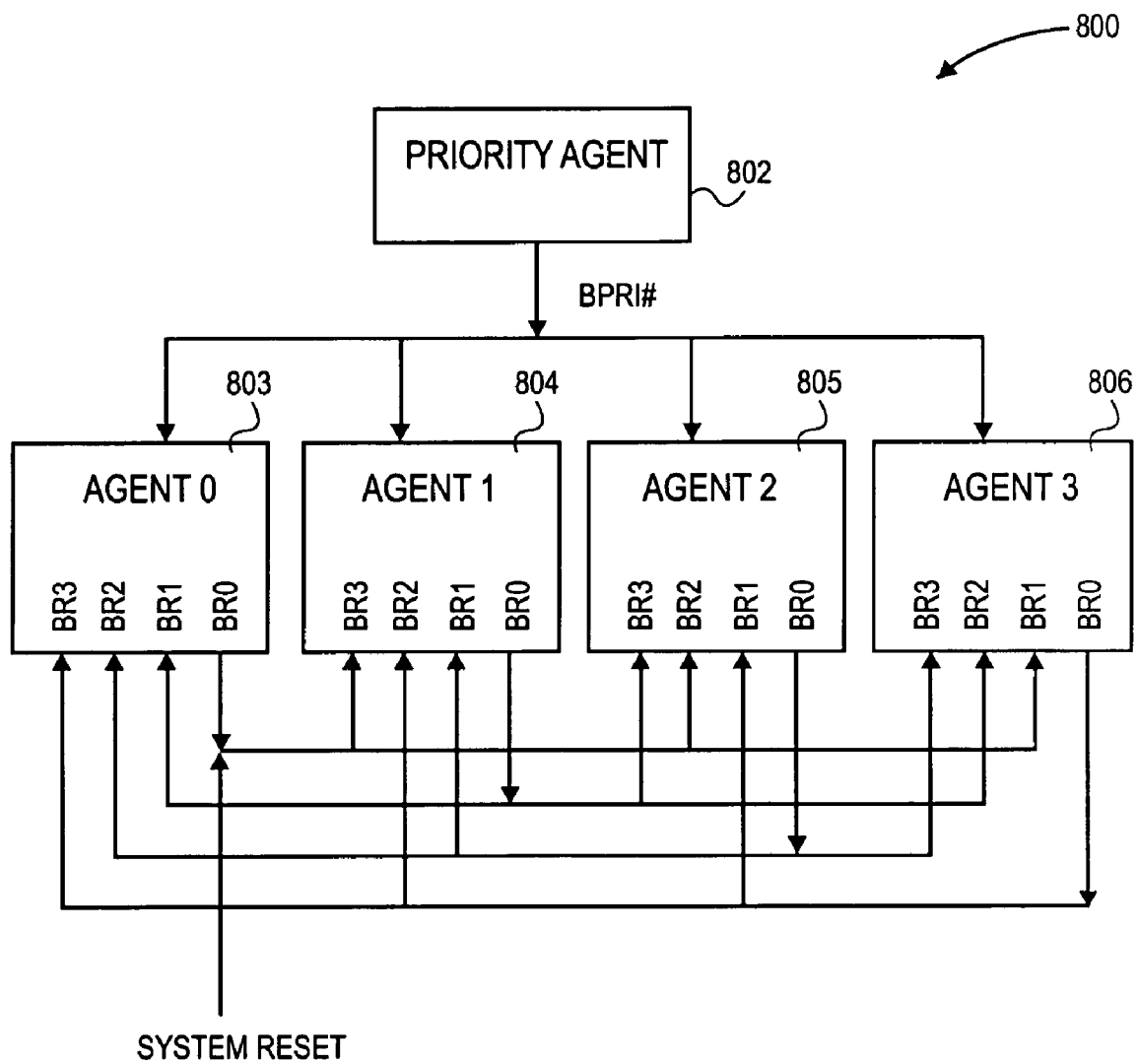
FIG. 8 illustrates a prior art symmetric arbitration scheme.

FIG. 8 illustrates a prior art symmetric arbitration scheme 800. In this scheme, a priority agent sends a bus request signal BPRI# to for agents 803 through 806, which in this case are symmetric agents. Each of the symmetric agents must have an input for all the symmetric agents in the system, which in this case requires BR0 to BR3 request inputs. This prior art scheme requires that priority agent to communicate its request signal BPRI# to all of the agents and each agent must have an input to receive all of the other agent bus request signals. Furthermore, each symmetrical agent requires built-in arbitration logic to implement a symmetric arbitration scheme.

Figure 9:
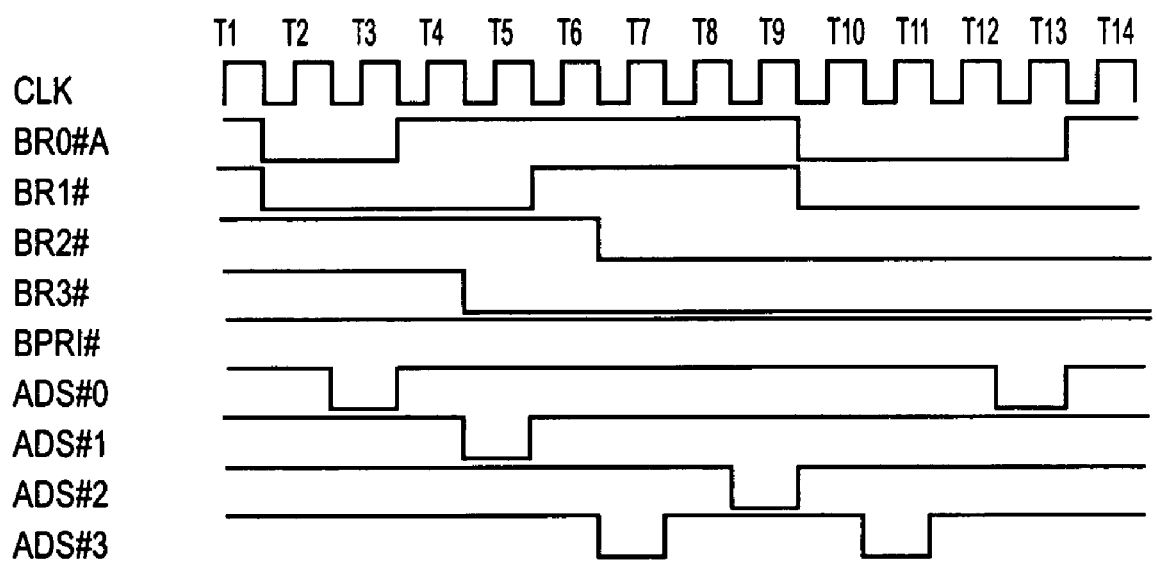
FIG. 9 illustrates a timing diagram using the symmetrical arbitration scheme without HLOCK.

FIG. 9 illustrates a timing diagram using the symmetrical arbitration scheme without HLOCK based on scheme in FIG. 8. Here, agent 0 is processor 0, agent 1 is processor 1, and so forth. In the prior art scheme, a round robin arbitration sequence is used—0→1→2→3→0. At T1 arbitration phase, processor 0 is granted bus access and ADS# is generated at T2. At T3 arbitration phase, processor 1 is granted bus access and ADS# is generated at T4. At T5 arbitration phase, processor 3 is granted bus access and ADS# is generated at T6 (BR2# inactive at T5). At T7 arbitration phase, processor 2 is granted bus access and ADS# is generated at T8. At T9 arbitration phase, processor 3 is granted bus access and ADS# is generated at T10 (BR0#, BR1#, BR2# inactive at T9). At T11 arbitration phase, processor 0 is granted bus access and ADS# is generated at T12. At T13 arbitration phase, processor 1 is granted bus access and ADS# is generated at T14. As evident from this timing diagram, such an arbitration scheme is inflexible.

In the foregoing specification, the invention has been described with reference to specific examples and embodiments. It will, however, be evident that various modifications and changes may be made thereto without departing from the broader spirit and scope of the invention as set forth in the appended claims. The specification and drawings are, accordingly, to be regarded illustrative rather than restrictive.

What is claimed is:

1. In a computing system having a boot-strap processor and at least one multi-processor, a method comprising:
    holding ownership of a bus by the boot-strap processor;
    requesting access to the bus by the multi-processor;
    using a dynamic arbitration scheme to grant ownership of the bus to the boot-strap processor or the multi-processor;
    assigning a timer to the boot-strap processor and the multi-processor; and
    granting bus ownership to the multi-processor if the timer for the boot-strap processor expired.

2. The method of claim 1, further comprising: altering the timer to the boot-strap processor; and maintaining bus ownership by the boot-strap processor based on the altered timer.

3. The method of claim 1, further comprising: requesting access to the bus by a priority agent; completing a pending bus cycle by the boot-strap processor; and granting bus ownership to the priority agent after the pending bus cycle is completed.

4. The method of claim 3, further comprising:
requesting access to the bus by the boot-strap processor and a multi-processor, the boot-strap processor and the multi-processor each associated with an identifier for determining bus ownership; and
granting bus ownership to the boot-strap processor or the multi-processor based on its associated identifier.

5. A computing system comprising
a boot-strap processor and at least one multi-processor;
a chipset including a state machine configured for holding the ownership of a bus by the boot-strap processor;
wherein the multi-processor requests access to the bus; and
wherein the state machine uses a dynamic arbitration scheme to grant ownership of the bus to the boot-strap processor or the multi-processor; and
a timer assigned to the boot-strap processor and the multi-processor;
wherein the state machine is further configured to grant bus ownership to the multi-processor if the timer for the boot-strap processor expired.

6. The computing system of claim 5, wherein the state machine is further configured to alter the timer to the boot-strap processor and maintain bus ownership by the boot-strap processor based on the altered timer.

7. The computing system of claim 5, further comprising: a priority agent to request access to the bus, wherein the boot-strap processor is configured to complete a pending bus cycle and the state machine is further configured to grant bus ownership to the priority agent after the pending bus cycle is completed.

8. The computing system of claim 7, wherein the boot-strap processor and one of the at least one multi-processor request access to the bus and the boot-strap processor and the multi-processor are each associated with an identifier for determining bus ownership, and wherein the state machine is further configured to grant bus ownership to the boot-strap processor or the multi-processor based on its associated identifier.

\* \* \* \* \*